Figure 4:
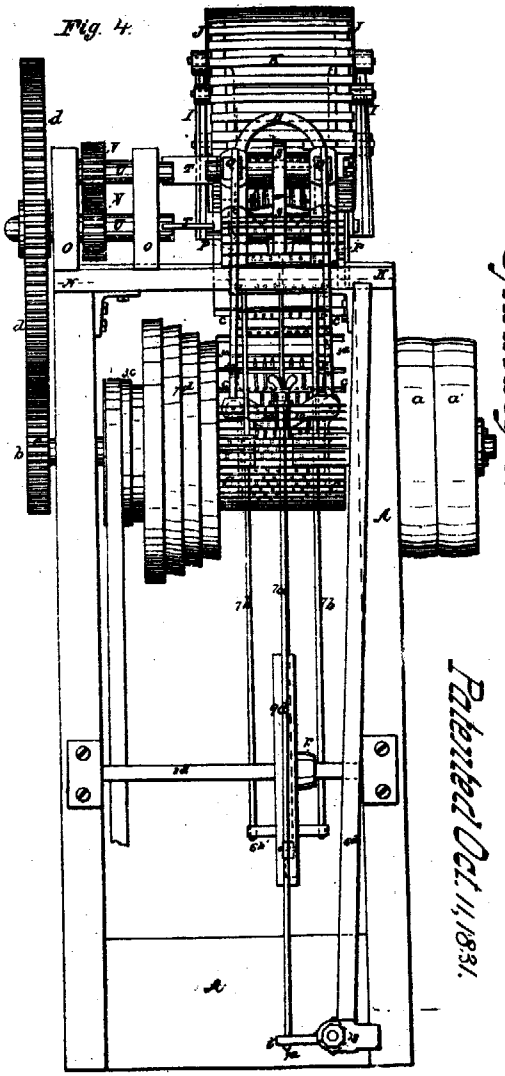

6794X
Sheet 1 - 2 Sheets
D. Treadwell.
Spinning Fibrous Material.
Patented Oct. 11, 1831.
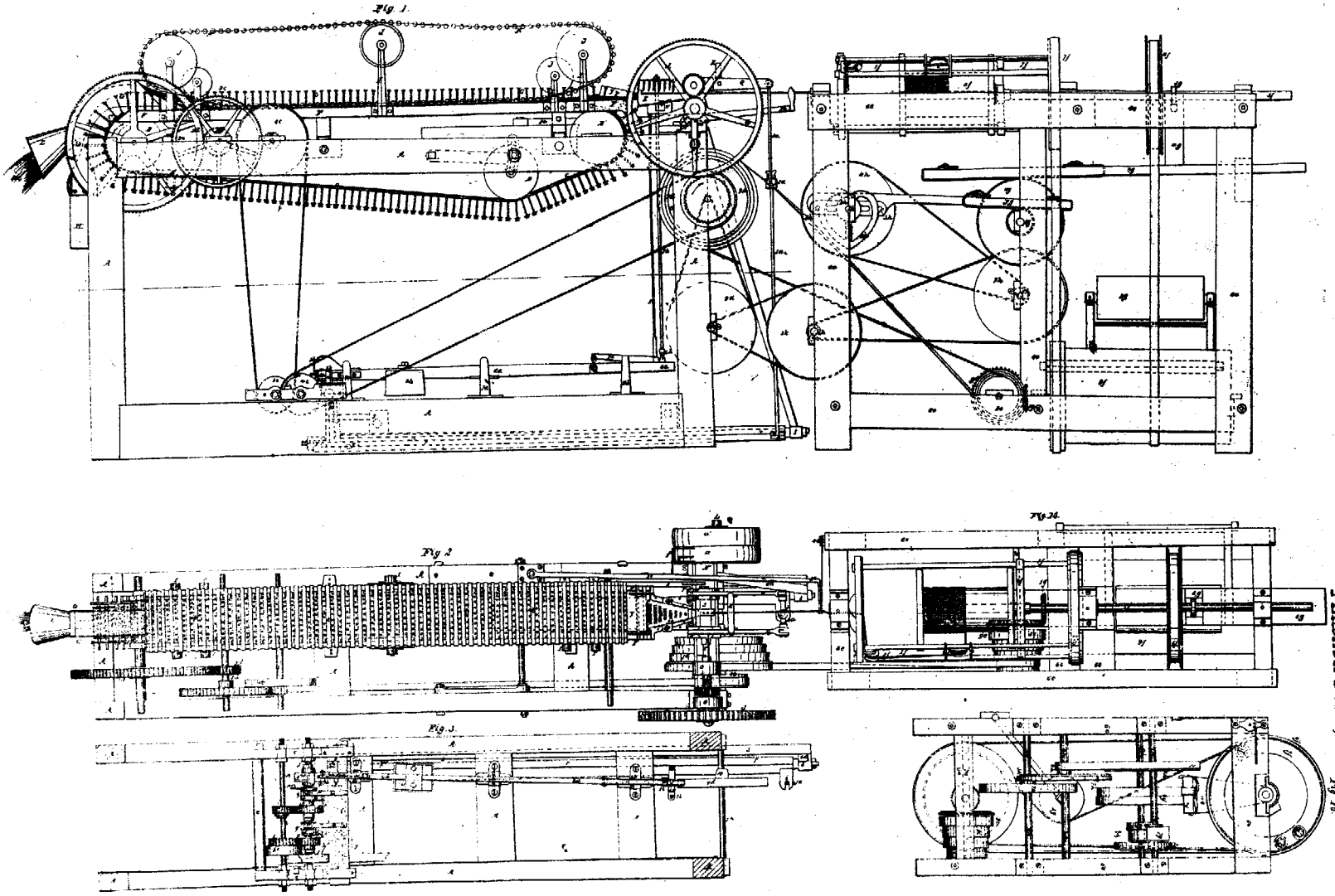

No Printed Specification Available

6794X

D. Treadwell.

Sheet 2-2 Sheets

Spinning Fibrous Material.

Patented Oct. 11, 1831.

6794X

Daniel Treadwell of Boston Mass.
Letters Patent dated Oct 11. 1831.

The Schedule referred to in these Letters Patent and making part of the same containing a description in the words of the said Daniel Treadwell himself of his Improvement in the machine for spinning hemp, flax and other fibrous substances.

---

Be it Known that the following is a true specification of an Invention made by me Daniel Treadwell of Boston in the Commonwealth of Massachusetts Engineer.

This invention is comprised in an improved machine, which I call a Gypsey for spinning Hemp, Flax and other fibrous substances. That the form proportions and relations of every part of the machine may be understood I have hereto annexed, in several Figures, complete drawings of a machine arranged for operation which drawings are referred to in this specification and are hereby declared to form a part of the same.

Before proceeding to the description, it will be useful to state that spinning may be considered to consist of two operations first the drawing out of a filament of the required fineness. from a mass of the fibrous material commonly in the state of a roving or roll and second, the twisting of the filament so drawn, which completes the formation of the thread or yarn: In some modes of spinning both of these operations are carried on at the same time in the same portion of the material that is the filament is elongated during the operation of twisting. In the invention herein described, the filament is drawn to the proper size before twisting it in any degree: and it will be hereafter seen that this improved machine or gypsey; consists of two distinct parts viz. the part represented in figures 1.2.3.4 and 5 by which a small filament is drawn from a column or roving; this for the sake of distinction I call the drawing frame and the part represented in figures 14. 15 and 16 - this I call the bobbin frame. The drawings herein referred to. were reduced from and represent a machine for spinning rope yarns.

The size of the several parts of the drawings. is to that of the machine as three inches is to a foot. The scale under figure 1. is applicable to all the figures. Machines for fine threads or linen yarns are necessarily made smaller than that here given in proportion to the fineness of the thread or yarn required.

Figures 6, 7, 8, 9, 10, 11, 12, 13:
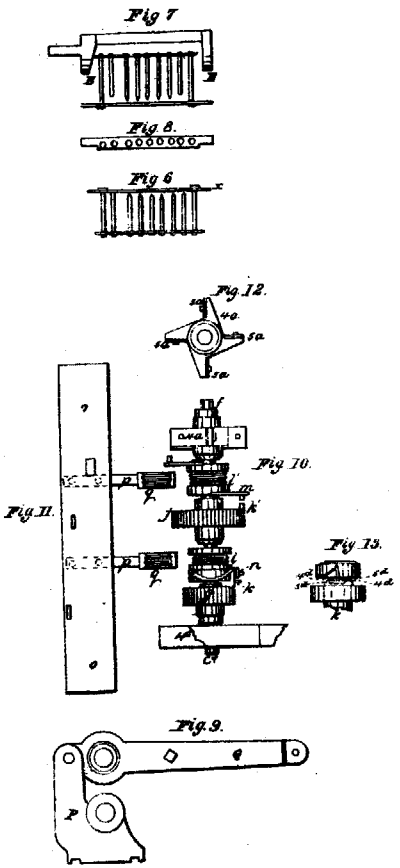
Figure 5:
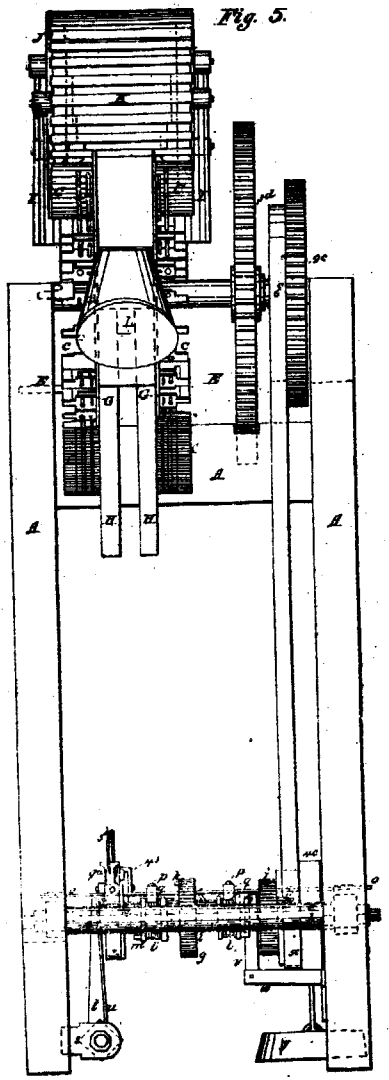

Figure 1 represents in elevation, a side view of the drawing frame. Fig 2 represents a plan of that part of the same frame which is situated above the dotted line passing across fig 1. Fig 3 is a section of the same frame, the part above the dotted line in fig 1 being removed. This figure is a plan Fig 4 is an elevation of the drawing frame as seen on the end when the filament is delivered from it. Fig 5 is an elevation as seen on the end where the hemp or roving enters the machine. Figures 6.7.8.9.10.11.12 and 13 are parts as seen detached from the machine. The same letters and signs are used to mark the same part as seen in any of the figures.

I shall now proceed to describe the drawing frame. A A A &c represent the wooden frame work of the drawing frame. Across the top of this frame pass two shafts supported in proper boxes to which B B. two pulleys are fixed and about which the hatchel belt C.C.C. passes and by which it is carried. This belt is formed as follows. A number (the machine as shown in the drawings has 146) of rows of iron or steel points are made and rivetted, or screwed firmly into iron plates called the hatchel plates see fig 6; each row contains 7 points. There is moreover at each end of every row of points, a pin having a head at its top. These pins are somewhat longer than the points Before fixing the pins to the hatchel plate, a second plate of iron x fig 6 and fig 8.

pierced with nine holes at distances corresponding with the points and pins. is placed upon
the points. the pins are then put in their place and rivetted or otherwise fixed to the hatchel
plate. This plate x is called the cleaver and ~~can~~ be moved freely up and down upon the points
and pins. the pin heads preventing it from falling off or being removed: it is longer than the hatchel
plate over which its ends project. one corner of the projecting part being cut out as seen in fig 8.
A strap of leather or of strong webbing 3/4 inches wide & long enough to form a belt about the
pulleys BB' is pierced with holes in rows crosswise. each row having five holes at distances equal
to those of the five middle pins fig 6. The distances of the cross rows from each other are 7/8 inch
and the holes do not form perfect rows lengthwise. but they are arranged as seen at the white
spots C.C.C fig 2. The strap thus pierced is passed between the cleaver and the points. the clea
ver being raised as seen fig 6. and the points are inserted in a row of holes; this operation is
repeated until all the holes are filled and the strap is then pressed down upon the hat
chel plate. In filling the strap. the rows of points are turned so that the wide space be
tween the first and second points fig 6. shall be to the right and left alternately in
the successive rows. the cleaver having been put on to the points so that the nicks from the
corners shall all be towards the same end of the strap. Another strap of like dimensions
with that just described but not pierced is then taken and laid upon a table and the
strap containing the rows of points is placed directly over it. the points being upwards
Two rivets are then fixed between every two rows of points through both straps or instead
of the rivetts the straps may be strongly sewed together through the spaces between the
rows of points. The straps with the points thus fixed to them are then passed round the pul
leys BB' and the ends being fastened together they form the hatchel belt as seen at CC fig 2
As the hatchel belt is liable to stretch by use. the binder pulley D is required to keep it
to a proper tension. The shaft of the pulley D has its gudgeons run in bearings which may
be moved up and down to adjust it. as will be seen & understood from figs 1 and 2.
To keep the hatchel belt evenly upon the pulleys B.B' the guide fig 7 is fixed to the
frame A A. the parts E! E! of the guide point downwards and the hatchel plates pass
between them. E. fig 1 shows the end of the guide in its place. Two cast iron rails F' F. F'
figs 1 and 2 are fixed parallel to each other upon the top of the wooden frame A A standing
above it upon feet or pillars which are fixed to the frame. The distance between these rails
is just equal to the length of the hatchel plates and their position such that the hatchel belt
is between them. The end F of both rails is one quarter of an inch above the line of the top of the pulleys B.B.' while from F' to F' the rails incline upwards so that the ends F' rise one
inch above that line and passing by the ends of the pulley B' at the right hand in fig 1 they
turn down in a curve as seen in the figure. There is a projecting ledge on the inside of each
rail about one inch wide running in the line of the tops of the pulleys B B.' Upon these
ledges the ends of the hatchel plates rest or slide. they therefore keep the hatchel belt straight
The ends of the cleaners which project over the hatchel plates, rest or slide upon the tops of the
rails F. F. F.' Two curved plates of iron G G are fastened by the wooden blocks H.H. to the
frame A A and are called the forcing plates. The figures 1.2 and 5 will show the shape place
and position of these plates. The pillows I I &c are fixed upon the rails F'. F'' and form
bearings for the gudgeons of the pulleys J J &c about which is passed the bobbin belt K K &c
This belt is made of a number of small wooden cylinders, called bobbins. Every bobbin has a
slit sawed into each of its ends. A number of bobbins are then laid parallel to each other
at proper distances and straps are passed into the saw slits and fixed there. When a suf
ficient number are in this way put on to the straps they are passed round the pulleys
J J &c and the ends of the straps are fastened and form the bobbin belt, as seen in the
figures. A tin tunnel L, is fixed between the forcing plates G G for the purpose of di
recting the roving or sliver of hemp M into the hatchel belt. This tunnel runs in the
direction of the dotted line between the forcing plate until it nearly meets the bobbin
belt.

I have thus described that part of the drawing frame which holds or carries
the hemp and from which it is drawn to form a filament.

I will next describe the apparatus by which it is drawn out. The roller sill N N
of cast iron is fixed to the wooden frame A A running across the top as seen in fig 4. There
are fixed upon the top of the roller sill, the four pillars O O. P P. O O are similar to each
other and the size, shape and place of them will be seen in the figs 1. 2 and 4.

P.P. which are likewise similar to each other but different from O O are
not seen distinctly in these figures. I have therefore marked their shape in fig 9. which
is an elevation as they would be seen on fig 1. if they were not hidden by other parts. The
levers Q Q are hung by pins forming fulcrums traves in the pillars P P. These levers
are connected together by the wrought iron bar R so that one cannot rise or fall
without the other rises or falls with it. The steel rollers S. S called the drawing rollers are
made to run one the lower in the pillars P.P. and the other, the upper, in the levers Q Q.

fig 9 shows the holes which form boxes for the gudgeons of the rollers. The drawing rollers are coupled
by the plates T" T" to the shafts U U running in the pillars O. O. and connected by the gear
wheels V. V. The roller sill has a projection on one side passing towards the hatchel belt.
A piece of cast iron W is fixed upon this projection and upon W is fixed the gatherer X.
This is made of plates of iron in nearly the form of an unequal four sided pyramid
with its open base towards the hatchel points. and its truncated apex opening between the draw
ing rollers being shaped so as to conform to those portion of the rollers which are situated against it.
To prevent the end of the gatherer last described from being worn two pieces of steel
plate are secured upon the inside of both sides being shaped to conform to the rollers as the
sides of the gatherer are. The top of the gather passes off towards the bobbin belt and a piece of tin or
thin iron plate is bent over it, on each side and passes down nearly to touch the hatchel plates
inside of the hatchel pins & outside of the hatchel points. This is called the tail of the gatherer and
is seen at Y. The top of the gatherer has several slits cut through it so that the teeth of the comb
8 b hereafter described can pass through it. There is moreover in the gatherer a false bottom hung
by a joint at the end nearest the drawing rollers and capable of being swung upwards like a
trap door, this false bottom has slits across it corresponding with those through the top. a is a
fast pulley upon the shaft b to which the power is applied by means of a belt to drive the )
machine. a' is a loose pulley on the same shaft b on which the driving belt may run when
the machine is at rest. On the end of the shaft b is the pinion c which drives the wheel d.d
fixed on the shaft U which is coupled to the lower drawing roller S
Let us now suppose a roving of hemp to be passed into the tunnel L and
the pulley B to be turned in the direction of the arrow. the bobbins lying between the rows of
hatchel teeth must be carried along with the hatchel belt. and as some of the bobbins by their
connection [illegible] forming the bobbin belt, constantly pass out of the hatchel belt at the right so
others constantly pass into it on the left. When therefore the roving of hemp passed into the
tunnel L meets the hatchel points it is pressed into them by the bobbins and passes along
in the hatchel belt until it arrives near the end F' of the rails F'. F'. Now as the rails
pass beyond the pulley B' to the right, and as the cleavers see fig 6. as has been before des
cribed pass on the top of the rails. it is evident that they will be raised upwards upon the
hatchel points and as the roving of the hemp is always above them, this also must be lifted
out of those points. Suppose that the end of the roving be then passed through the gatherer
X and that it be made to enter the drawing rollers. If the drawing rollers are now turned faster than the hatchel belt carrying the roving, the roving must be drawn out through the
hatchel points by the rollers forming a filament as much smaller than the original roving, as the
rollers move faster than the hatchel belt. If however the relative motion be constant then these
proportions will be true only when the mean size of the filament is compared with the mean size
of the roving, for the roving is not supposed to be of equal size throughout and more over the ends
of the fibres of hemp cannot be distributed at equal distances in it, hence more of these ends will
be taken into the rollers together at some times than at others. Now when many ends meet
the rollers together many fibres must be drawn out of the hatchel together, and the filament
be made larger than at other places, where the ends of fibres by being distributed in the roving
at greater distances meet the rollers less frequently. To prevent as much as possible this inequal
ity in the filament I use the apparatus now to be described, which I call the regulator and
the comb. A small cast iron frame e. e. e &c is fixed upon the wooden frame A A as seen
in the drawing. The shaft f. f. is made to run on proper centres fixed in the frame [illegible]
and there are placed upon it the wheels g. g'. (The shaft f f with its connexions is drawn
separated from the frame at fig 10). These wheels are bored with a round hole and are capable of
turning freely upon the shaft f f except as hereinafter described but are prevented by proper
collars from slipping in the direction of the length of the shaft. A second shaft h. h. is made to
run upon centres in the frame e. e parallel to f. f. There are firmly fixed upon the shaft h. h
the wheels i, i'. The wheels g and i have 50 teeth each and the wheels g' and i have 70 teeth
each and the diameters of all the wheels are in proportion to the number of their teeth. The teeth
of g play into those of i. and the teeth of g' play into those of i'. There are two locking pins o
[illegible] k. k' fixed upon the wheels g. g' — l l' are two clutch boxes placed upon the shaft f f. These
clutch boxes are free to slide in the direction of the axis of the shaft, but pins are fixed in the shaft
which project into a groove cut lengthwise on the inside of each clutch box, so that the boxes cannot
turn round upon the shaft. Several parallel grooves are turned into the body of each clutch
The [illegible] of locking pins m, m' are fixed upon the clutch box
box l' and the clutch n. is connected with the clutch box l by a movable joint which
permits its outer end to fall back towards the middle of the clutch box, it is prevented how
ever from falling back except on the application of a slight force by a steel spring which is fixed
at one end to the clutch box while the other end presses upon the catch n. There is a stop screwed
to the clutch box to prevent the spring from forcing the catch n. outward beyond a certain
distance. A slide bar o. o. is placed in the frame e. e. parallel with the shafts f. f. and h. h.
and is capable of being moved in the direction of its length, and in that direction only. Two arms p. p are screwed upon the top of this slide bar and paſs from it towards the shaft f. f and
terminate directly over the clutch boxes ll' that is one arm over each clutch box. There is fixed
to the under side of each arm p.p. a metal block or box q.q. which paſs down to the clutch boxes
The underside of q q are formed in the shape of a portion of a hollow cylinder and are grooved
so as to embrace the clutch boxes upon the grooves before described upon them through about one
third of their circumference. (Fig 11. shows the slide bar o.o. and arms with the boxes q.q. separated
from the other work. The figure represents the under side of these parts) A long shaft or axle r.r.r
paſses horizontally from under the slide bar o.o. to the right hand as seen in the drawings until
it projects beyond the frame A A &c (In fig 2 this shaft is supposed to be broken off under the
drawing rollers S S and the left hand part is removed) r.r.r is hung in centres which are fixed
in the iron bearing s.s. This bearing is bolted to the frame A A &c and prevented from spring
-ing by the iron brace b.d. The arm t paſses horizontally from the right end of r.r. and the
arm t' rises vertically from its other end directly under the slide bar o.o. A steel spring u. is
fixed upon the shaft r.r. near its middle. This spring runs along on the side of the shaft and
turns upwards against the side of the arm t' until it reaches the top of t' against which it
preſses with its whole elastic force. A connecting rod paſses from a hook in the top of the spring
u. to another hook fixed in the underside of the slide bar o.o - v is a bent lever its fulcrum
being a pin which paſses through its middle and unites it to the bearing w. which is fixed to
the frame A A. The vertical arm of the lever v is united at its top by a connecting rod with
a hook which is fixed in the bottom of the slide bar and the horizontal arm of the same
lever is [illegible] ded with the weight y. These hooks and connecting rods will be found in
their places in fig 5 from the description no letters of reference being thought neceſsary.
(It will be seen in fig 1 that the shaft r. r and the bearing s. s are [illegible] in dotted lines
behind a part of the frame A A - the spring u. the weight y and some other parts will
likewise be found, in dotted lines, in the same figure) From the arm t of the shaft r. r.
there paſses upwards the rod. 1 a, 1 a (which is united with t by a moveable joint) to the
croſs bar 2 a. 2 a. The rod 1 a paſses through the middle of 2 a and receives a thumb nut
upon its top. The connecting rods 3 a 3 a paſs from the ends of the croſs bar 2 a and are united by
pins to the levers Q Q one rod uniting to each lever.

In addition to the parts heretofore described as connected with the shaft f.f there is placed
upon that shaft, the star wheel 4 a a side view or elevation of which is given detached at fig 12.
5 a. 5 a. 5 a. 5 a are plates of steel screwed upon the sides of the projecting points of the star wheel and the breadth of these plates is greater than the thickness of the points of the wheel, so that
they project over the sides of the points. The star wheel is fitted to the shaft f. f. like
the wheels g. g' the shaft passing through a round hole in its centre and proper collars
are fixed to the shaft on each side of it to prevent it from sliding in the direction of the
length of the shaft. A wooden lever 6a 6a passes from a point near the star wheel horizon
tally to a point directly under the gatherer. A piece of brass is screwed upon the under
side of this lever, near its middle, and a pin passes through this brass and through the
cast iron pillars 7a. 7a which are fixed to the frame A A. This pin forms the
fulcrum on which the lever turns. Two other pillars 8a. 8a, rise from the frame A A on
the sides of the lever 6a to prevent it from having any lateral motion. A small piece of steel
9a which I call the bob is united to the end of the lever 6a by a pin passing through it near
its middle, and likewise through two knuckles standing out from a piece of brass 1b fixed
to the underside of the lever 6a. The lower end of the bob 9a when the lever 6a is in the
position shown in the drawings is in the horizontal plane of the centre of the shaft
f. f. but so far from that shaft to the right, as seen in figs 1 and 3 that the projections of the star
wheel 4a are just capable of reaching it and and throwing it upwards whenever the star
wheel is turned round for the purpose.

A stop 2b of iron is screwed upon the top of the lever 6a and a slight spring
3b tends to keep the top of the bob against the stop 2b. A pall or click 4b having its
lower end connected by a pin with the frame e. e. passes upwards through a hole or slot in the
slide bar o. o by the side of the lever 6a. The click 4b can move on the pin which unites it
with the frame e. e. with which it forms a hinge joint so that its top may describe an arc
in the [illegible] of the length of the slide bar. A spring is fixed to the frame e. e. (seen
in dotted lines in fig 3) which acts against the click 4b and tends to press it against the
lever 6a. so that whenever the end of that lever (at the left hand in figs 1 and 3) is
raised above the top of the click, then the click slips under a piece of steel which is fixed
upon the corner of the lever where the click meets it and holds it up. But as will be
hereafter seen it is required that the click should not remain under the lever except when
the clutch box l' is carried by the slide bar o. o. so near the star wheel that the catch on is
engaged against one of the plates 4a therefore to remove the click 4b from the lever 6a except
in the case before stated a piece of iron constituting a stop is screwed over one side of the hole or
slot in the slide bar, so that whenever the slide bar is moved so far to the right as seen in fig 5.

as to disengage the catch on' from the star wheel. that the stop above described shall press upon
the side of the disk 4b opposite to that against which the spring rests, and bending the
spring disengage the disk from under the lever 5b is a weight upon the left arm of the
lever 6a tending to depress the arm to which it is attached. To the top of the lever 6a near
its right end, as seen in figs 1 and 3 is united by a hinge joint the cross bar b. b, to each
end of which are fixed rods 7b 7b. which pass directly upwards through guide holes in
the piece of cast iron W, each side of the gatherer, and on the outside of the same and are
fixed by their tops to the comb 8b. The comb is formed of several rows of iron or steel teeth
rivetted to an iron plate. the dots on the top of the plate in fig 2 show the number and
place of the teeth. The several rows of teeth are directly over the slits in the top of the
gatherer, which have been before described and on the application of a proper force to
depress the comb, the teeth pass through these slits into the roving of hemp which is in the
gatherer. Two cast iron pillars 9b are fixed to the frame A A &c and rise upwards
above the lever 6a on each side of the same. A small lever 1c is placed between the
pillars 9b directly over the lever 6a and is hung upon a pin which passes through
9b. 9b near their tops and through 1c. This pin forms a fulcrum or axis on which 1c turns
To the right end of 1c as seen in figs 1 and 3 there is connected by a movable joint, the rod
2c which passes directly upwards through guide holes in the piece of cast iron W and the
bottom of the gatherer before described. The left end of the lever 1c as seen in figs 1 and 3. is
connected with the lever 6a by hooks. It will be readily perceived by this description and
the figures, that when the right end of the lever 6a is depressed the right end of 1c will
be elevated and carry the rod 2c upwards, which will lift the false bottom before des-
cribed of the gatherer the teeth of the comb passing at the same time through the slits before
described made in the false bottom of the gatherer upon the shaft b. b is fixed the pulley 3c
from which a belt passes to and over the pulley 4c fixed upon the shaft f. f, Upon the
shaft h. h. is fixed the pulley 5c and from the pulley 5c a belt passes to and over
the pulley 6c which is fixed upon the shaft 7c running in proper boxes in the upper
part of the frame A A &c. The shaft 7c has the pinion 8c fixed upon it and the pinion
drives a wheel 9c which is fixed upon the shaft 1d running in boxes upon the top
of the frame A A parallel to 7c and carrying besides the wheel 9c the pinion 2d.
The pinion 2d drives the wheel 3d which is fixed upon the shaft of the pulley B
To understand the operation of the regulator the comb and other apparatus connected with and necessary to it, let us suppose the roving of hemp to have been passed through the tunnel I. and along the hatchel belt and its end to be between the drawing rollers S.S. as has been before described. Let us also suppose that a constant rotary motion be given to the rollers SS in the direction required for drawing out the filament through their connexion by the shafts wheel pinion &c which has been before described with the pulley a which is driven by a belt carried by any sufficient power. The motion from the pulley a must likewise be communicated to the pulley 3e and from thence through the belt passing from 3e to 4e by which the shaft f f must also be turned. Suppose moreover that the thumb nut upon the top of the rod 1a has been so fixed that when the filament between the rollers SS is of the required size the catches m. m' n. shall all be dis-engaged.

In this state of things the motion of the shaft f f will not be communicated to the wheels g. g' nor to the star wheel 4a. but they will all remain at rest, with the shaft f f revolving in them. As the hatchel belt is under the condition stationary. the roving is not advanced to the drawing rollers, and it must therefore soon happen that the filament will become too small as soon as this is the case in a small degree. the upper drawing roller. which presses upon and is supported by the filament beneath it, must fall, and the ends of the levers Q Q which pass from the rollers to the right in figs 1 and 2 must be depressed and the rods 3 a ; the cross bar 2a and the rod 1a likewise must drop downwards. Now the weight y, acting through the lever v y on the slide bar o.o. tends constantly to draw the slide bar to the right as seen in fig 5. but this tendency is ordinarily resisted by the connexion of the slide bar with the spring u. fixed upon the shaft t,t. the horizontal arm k of which shaft is united by a joint with the rod 1 When however the rod 1a passes downwards. the arm k no longer supported. cannot keep the shaft t,t. and the spring u. in their former position, but it suffers the weight to carry the slide bar to the right. the slide bar carrying with it the top of the spring u. which at the same time so the shaft t.t. depressing the arm k.

When the slide bar o.o. moves as herein described to the right it carries the boxes g. g, and likewise the clutch boxes l l' with it. The clutch boxes are by reason of the connexion with the shaft f. f. as before described always constrained to revolve with the shaft f f and the catches m. and n are of course carried round with them. If therefore the clutch boxes are carried far enough to the right as seen in fig. 5. the catches m and n would strike the pins h and h' respectively ; but as the pin h is larger than h' and approaches more nearly to the circle described by n, than the pin h' approaches that described by m. the motion of the slide engages m against k. before m. can strike k'. It will be at once perceived that as soon as m is engaged against k
the wheel g will be made to revolve. this will drive the wheel i. by which the pulley 5 e must
revolve, and the motion of 5 e will be communicated by its belt to the pulley 6 e and from thence
through the pinion 8 e the wheel 9 e. the pinion 2 d, and the wheel 3 d to the pulley B by the revolution of
which the hatchel belt will be moved and the roving advanced towards the drawing rollers SS. with
a certain velocity which will be found by measuring the several pulleys. wheels and pinions which
are concerned in communicating and modifying the motion. If by the advance of the roving with the
velocity thus obtained as many fibres of hemp are presented to the drawing rollers as are required to in
crease the filament to its proper size, then the upper drawing roller is raised by the filament thus increased
and the slide bar o.o. by reason of its connexion with the upper roller (through the connecting rod
and hooks. the spring m. the shaft r,r. the arm t. the rod 1 a the cross bar 2 a. the rods 3 a and
the levers QQ) will be carried to the left as seen in fig 5 and the clutch boxes will be moved
with it. by which the catch m. will be disengaged from the pin k. when the wheel g and the
several pulleys and wheels and pinions by which it gave motion to the pulley B must come to a state of rest
and the further advance of the roving to the drawing rollers will cease.

Let us suppose however that when m. and k are engaged and the roving
advancing as heretofore described, the size of the filament does not increase, but that from
the smallness of the roving. the fibres are presented to the drawing rollers so unfrequently that
the filament diminishes yet more in size. In this case the upper roller will continue to fall
and the slide o.o. connected with it by the apparatus before described. will continue to move
to the right as seen in fig 5. until the catch m engages the pin k' upon the wheel g' and
carries it round with it. Now it will be seen that the wheel g' is larger than the wheel g. while
the wheel i' is smaller than the wheel i. in this new connexion therefore the shaft h and the
pulley 5 e will be driven faster than they were when their motion was derived from the wheel g.
and the greatest velocity of the pulley 5 e being communicated by the belt pulley. wheels and pinions
as has been before described to the hatchel belts the roving of hemp must be advanced more rapidly to
the drawing rollers SS and by this the filament receives a greater accession of fibres in a given
time. When by this accession of fibres the filament is increased to the proper size. the [illegible] roller
will rise and the clutch boxes will be carried to the left. the catch m be disengaged from the
pin k' and the hatchel belts and roving will rest.

It will be seen that while the wheel i' is driven by the wheel g' the
wheel g must be driven by the wheel i. in this state of things the pin k will make more revolutions in a given time than the catch m and as they come in contact with each other it is necess-
ary that k should pass m without a permanent locking. Now when k strikes m in this way the contact
is upon the sides opposite to those which were struck when k was driven by m, and to let them
pass each other the sides or corners of both m and k which would otherwise catch and interrupt the
motion are taken off and the end of the pin and the edge of the catch from inclined planes
which sliding upon each other the catch is forced backwards against the resistance of the spring
heretofore described and thus k passes by m; the spring always causing m to return to its former
position after k has passed it. Figure 13 shows the form of m and k. 4d. 4d are the faces which
strike when k is driven by m. and 5d. 5d are the inclined planes which meet when the wheel g
is driven by the wheel [illegible].

Let us now consider the operation when the filament is too large. Suppose
that the advancement of the roving, as before described, brings so great a number of the ends
of fibres in contact with the drawing roller that the filament not only attains a sufficient
size but becomes too large. In this case the upper roller supported upon the filament
is elevated above its ordinary place, and by means of the connexions heretofore described
the arm t is, carried upwards, the shaft d. rolling back. the top of the spring u is carried
to the [illegible] and the slide o o. and the cloth boxes also, from their connexions before described
must be carried to the left. This brings the face of the catch m' into contact with the projection
of one of the plates 5 a. and from this engagement the star wheel 6 a is made to revolve
with the shaft f. As soon as this revolution commences. one of the plates 5 a upon one of
the points of the star wheel must strike the bob 9 a, and throw the end of the lever 6 a. to
which it is attached. upwards which will be caught and held by the pall or click 4 b.
The length of the pall or click 4 b is such that it catches the lever 6 a when it is carried
to the highest point that it can be carried by the star wheel consequently when it is so
caught the points of the star wheel do not by their continued revolution strike with much
force if they strike at all upon the bob. It will be at once perceived by an inspection of the
drawings that when the left end of the lever 6 a to which the bob is attached, is thrown upwards
the right end must be depressed, and the comb 8 b be carried downwards at the same time
the right end of the lever 6 e must from the connexion of that lever as before described with the lever
6 a be carried upwards and its motion being communicated by the rod 2 e to the false bot-
tom of the gatherer that will be carried upwards. these motions of the comb and of the false
bottom of the gatherer will cause the teeth of the comb to be passed into the [illegible] of roving which is in the gatherer. This will prevent the free passage of the fibres of which the roving is
made up. to the drawing rollers while some of the fibres. the ends of which are already in the draw
ing rollers. will be broken off and thus the size of the filament will be speedily reduced to its
proper dimensions. It may happen on the passage of a lock of tow or a knot of entangled fibres
through the rollers, that they will be separated to a considerable distance. In this case when
the clutch boxes on the shaft f f are brought against the collars of the wheels g and 4 a.
so that the slide o.o. cannot pass any further to the left, the spring w. yields as the arm t rises
on the separation of the rollers and as soon as the tow or other matter has passed and the
upper roller falls. the spring w, returns, by its elasticity to its former state. When the fil
ament has been reduced to the proper size the upper roller must consequently fall to the
place which that size of filament determines. This motion being communicated to and
modified by the various parts connecting the upper roller with the slide o.o. as heretofore
described, the slide bar must move to the right. as seen in fig 5 and the pall or click 4 b
being by the action of the stop fixed as heretofore described upon the top of the slide bar
carried from under the corner of the lever 6 a the weight 5 b will cause the arm of the
lever to which it is attached to fall. by which the comb will be raised and the false
bottom of the gatherer will be depressed and thus no further interruption be offered
to the passage of the roving to the drawing rollers.

The [illegible] parts of the drawing frame remaining to be described are the
cone pulley 7 d. upon the shaft 6, the shaft 8 d and the pulleys 9 d and 1 e upon the
same: and the stopping guide 2 e 2 e. 2 e. But as these parts are connected in their use
with the bobbin frame. I shall notice them as may be necessary hereafter.

Having thus described the construction and mode of operation of the
principal parts of the drawing frame I shall proceed to describe the second part of the
Gypsey viz the bobbin frame by which the filament is twisted and wound up.

Figure 14 represents an elevation of this frame in its position as con
nected with the drawing frame. Fig 15 is a plan of the bobbin frame and Fig 16. an eleva
tion as seen in the end next the drawing frame. Figs 14 and 15 may appear as continuations
of Figs 1 and 2. I have however marked them as distinct figures in accordance with the
division adopted for describing the whole machine. The wooden frame of the bobbin frame
is presented at 6 e. 6 e. 6 e &c. Across this. near its bottom passes the shaft 7 e having
its ends placed in proper boxes upon the frame 6 e. 6 e &c. Upon the shaft 7 e is fixed the cone pulley 8e which is driven by a crossed belt running from the cone pulley 7d upon the drawing frame. There is moreover upon the shaft 3e the lower gear wheel 9e. The flyer is shown at 1f. 1f &c its gudgeons, both of which are hollow, running in proper boxes in the frame 6e &c. 2f 2f are sheaves or pulleys over which the yarn runs to be wound upon the bobbin. The bobbin spindle 3f runs in a box upon the frame 6e. 6e and in a bar marked 4f which is placed upon the bars of the flyer and crosses from one side to the other of the same and is capable of sliding upon the bars in the direction of their length. It will be understood that the spindle passes through the ~~hollow~~ centre of the right gudgeon of the flyer as seen fig 14. the hole through the gudgeon being somewhat larger than the spindle. 5f is the bobbin placed upon the spindle and kept in place by a pin which passes through an ear or small piece of iron which is fixed to the bobbin and likewise through the spindle.

The pulley 6f is fixed to the bobbin spindle and the pulley 7f is fixed to the flyer. The drum 9f has its gudgeons placed in proper boxes fixed to the frame 6e 6e. The bevel wheel 1g is fixed upon the shaft of this drum and being driven by the bevel wheel 9e causes the drum to revolve. A belt passes from the drum 9f to the pulley 6f and another belt from the same drum to the pulley 7f. The binder pulley 2g rests upon the belt which passes from the drum to the pulley 6f, for the purpose of keeping that belt at a proper degree of tension, which may be regulated by weights placed upon the frame in which the pulley revolves which frame as will be seen in the figures, is hung by gudgeons which move in the frame 6e 6e &c From what has now been specified it will be seen that motion being given as heretofore described, to the drawing frame, such motion must be communicated from the pulley 7d on that frame, by the belt to the pulley 8e on the bobbin frame and from thence by the bevel wheels 9e and 1g. to the drum 9f. It must moreover, be evident that the pulleys 6f. and 7f will at the same time be made to revolve as they are connected by belts with the drum 9f. The filament therefore as delivered from the drawing rollers, being passed through the hollow gudgeon in the left end of the flyer fig 14 and over the pulleys 2f 2f. to the bobbin to which its end is fastened, must be, by the revolutions of the flyer and bobbin be twisted. In order however that it may be wound upon the bobbin it is necessary that the bobbin and flyer should not make an equal number of revolutions in an equal time.

6794x Oct 11, 1831

Now it will be seen that the end of the drum 9 f from which the belt paſses to the pulley 7 f is larger than the other part of the same drum while the pulley 6 f and 7 f are nearly equal in size.

Hence the flyer will make a greater number of revolutions in a given time than the bobbin. The tendency therefore will be to wind up the yarn upon the bobbin with a rapidity proportional to the difference between the speed of the bobbin and that of the flyer. that is whenever the flyer shall have paſsed through one revolution more than the bobbin, then one turn of yarn must be wound upon the bobbin. But the bobbin increases in size as the yarn is wound upon it and consequently the turns of yarns as the circumference of the bobbin increases become longer. It is neceſsary therefore that as the bobbin fills. it should approach more nearly in its revolutions to those made by the flyer. Now the flyer is driven with a uniform velocity and the filament also is delivered from the drawing rollers with a uniform velocity. Suppose then that the circumference of the bobbin when naked be one foot and that the surface of the drawing rollers moves through one foot in two seconds. and that the flyer makes twenty revolutions in two seconds then that the yarn may be wound up: the bobbin must make mireteen revolutions in two seconds When however the bobbin by being filled with yarn. has a circumference of two feet it is evident that it must make nineteen and a half revolutions [illegible] two seconds that the same object may be accomplished. the velocities of the drawing rollers and the flyer remaining constant. To provide for the required increase of velocity in the bobbin it is only neceſsary that the belt which paſses from the drum 9 f to the pulley 6 f shall be of so slight tension that it may be ~~[illegible]~~ made to slip in some degree by the pulling of the yarn itself upon the bobbin from the constant tendency, by the flyer, to wind it up.

For the purpose of spreading the yarn over the whole surface of the bobbin it is neceſsary that the bobbin should be moved alternately through a space equal to its length in the direction of its axis. To accomplish this. a collar is placed upon the spindle at 3 g. This collar runs in a stud 4 g which stands upon the slide 5 g which slide can be moved in the direction of its length its right end resting in a proper box on the frame 6 e.

Two chains or straps paſs from buckles on the slides 5 g seen in fig [illegible] 14, over the top of the pulley 6 g in opposite directions and are fastened to the periphery of the pulley on different sides of the same. Two other chains or straps similar to those above described pass from buckles on the slide or rod 7 g and are connected with the small pulley 8 g. The pulleys 6 g and 8 g are upon the same shaft 9 g the gudgeons of which run in proper boxes in the frame 6 b. It will be understood that the arrangement of chains or straps, connecting the slide 5 g with the pulley 6 g and the slide or rod 7 g with the pulley 8 g. is similar to that often used for moving the pistons of pumps or fire engines. Upon the shaft 1 h which runs in proper boxes on the frame b b b e is fixed the heart wheel 2 h. Two pins 3 h 3 h are fixed to the slide or rod 7 g so that their sides are in contact with the heart wheel on opposite sides of the same. Upon the shaft 1 h is fixed the pulley 4 h from which, a belt passes to the pulley 5 h upon the shaft 6 h. Upon the same shaft 6 h is fixed the pulley 7 h from which a belt passes to the pulley 8 h upon the shaft 9 h. upon which shaft 9 h is fixed the pulley 1 k. The shafts 6 h and 9 h run in boxes fixed to the frame 6 e 6 e. The pulley 1 k is connected by a belt with the pulley 1 e heretofore referred to upon the drawing frame. It will be seen that there is upon the same shaft with 1 e the pulley 9 d. From this pulley 9 d, a belt passes to and round the shaft b.

To understand the effect of the parts last described in giving an endwise motion to the bobbin. suppose the shaft b of the drawing frame to revolve, its motion will be communicated by the belt to the pulley 9 d which will turn the pulley 1 e upon the same shaft shaft with it. The rotation of 1 e will give motion to 1 k whence as will be at once perceived the pulleys 8 h, 7 h. 5 h and 4 h. together with the heart wheel 2 h by reason of their connexions as heretofore described must all revolve.

The revolution of the heart wheel gives a rectilineal alternating motion to the rod or slide 7 g. This rod or slide from its connexion with the pulley 8 g communicates a circular alternating motion to that pulley, which motion must likewise be common to the pulley 6 g. and 6 g must communicate by reason of the connexion as heretofore described a rectilineal alternating motion to the slide 5 g. It is evident that the motion of 5 g will be communicated to the spindle 3 f. the bobbin 5 f, the pulley 6 f and the bar 4 f, which forms one of the boxes in which the spindle revolves. The belt which passes from the pulley 6 f to the drum 9 f will during this endwise or rectilineal alternating motion of the bobbin pass along over the bodies of the drum 9 f and the binder pulley 2 g.

There remains to be described only the apparatus by which the motion of

6794x Oct 11, 1831 the machine is destroyed, whenever the thread or yarn is from any cause broken. The first part of this is called the stopping guide and is seen on the drawing frame marked 2 e . 2 e figs 1 and 2. It is a rod of iron, hung by a hinge joint at one end, to the frame A A No. From the end which forms the joint the rod passes horizontally towards the bobbin frame when it reaches nearly to that frame, it is bent so as to pass directly under the filament or yarn, where it is under the operation of twisting. from this it is again bent upwards so as to form a sort of hook, which lies against the side of the yarn as seen in fig 1.

Upon one side of the rod thus described, is [illegible] a piece of iron [illegible] a [illegible] as seen in fig 2, and through this fork as here seen, the main belt by which the machine is driven passes from a drum above to the pulley a. To the end of the stopping guide next to the bobbin frame is fixed a cord which passes from it [illegible] and over the sheave or pulley 4 e placed upon the bobbin frame, seen at fig 16. and to the end of this cord a small weight is attached.

To understand the operation of this apparatus, let us suppose the main belt to be running upon the fixed pulley a by which the machine must be kept in motion. Under this condition if the yarn be forming and whole, and attached to the bobbin it will be drawn in a right line from the drawing rollers to the axis of the flyer. At the same time the weight attached to the cord which passes from the stopping guide, as before described, tends constantly to draw the end of the stopping guide towards the pulley 4 e, but as the end of the stopping guide passes upwards by the side of the yarn, it cannot move towards the pulley 4 e without carrying the yarn before it and in this it is resisted by the whole tension of the yarn. Under these conditions therefore, the main belt will continue to run on the pulley a. When however the yarn breaks, the force which kept the stopping guide in its place is destroyed, and it is moved at once by the action of the weight upon the cord as before described, toward the pulley 4e and by this motion, the main belt is carried by the forked guide before described on to the loose pulley a' and consequently the motion of the machine will no longer be maintained.

The particular form of stopping guide here described is suited to a [illegible] which is driven by a belt passing from a drum placed above it. Some modification of form will be required to suit it to a belt passing to it in another direction. But this and other modifications of form such as adapting it to a clutchbox instead of a belt, it is not necessary to describe as they are not changes of character or principle in the apparatus.

6794x Oct 11, 1831

It has been necessary in the preceding specification to describe a great many mechanical instruments which are in common use in various machines. This has been done that their application in this machine might be understood, and without intending to advance any claim to have invented them. Thus levers, wheels, pinions, clutch boxes, belts, pulleys, rollers shafts, hatchel points, flyers, spindles and many other instruments not necessary to enumerate are the common property of mechanics and I make no claim to have invented any of them, either generally or in particular forms and proportions in which I have described them. Again I have in this machine used many simple combinations of these instruments which are not of my invention, such as combining wheels with pinions, belts with pulleys, clutch boxes with shafts, and other like relations, which need not be named as exceptions to my invention as I shall proceed to state definitely, that which I have invented.

First then I have invented the combination of plates, points, pins, cleaners, straps &c as herein described which forms the hatchel belt, which I have combined with the pulleys rails, and forcing plates; the whole forming the apparatus from which the hemp, flax or other fibrous substance is drawn out.

Second I have invented the combination of instruments which constitutes the regulator, as herein described together with the apparatus connecting it, 1st with the prime mover of the machine 2nd with the lever in which the upper roller revolves - and 3rd with the hatchel belt, as herein described.

In using the words "as herein described" I do not mean to limit my invention to the specific form in which the regulator and connecting apparatus are constructed for it is obvious that many changes may be made in them without affecting them in principle or character. Thus by way of illustration, pulleys, and belts may be used instead of gear wheels, springs may be substituted for weights &c or the same parts may be used under great varieties of form, position and modes of connexion, and yet the character of the invention remain unaltered.

Third I have invented the combination of the comb and apparatus by which it is operated upon, in the relations and under the conditions as herein described. I do not intend in this any more than in the preceding summary, to limit my claim for letters patent to the specific form of comb and connecting apparatus described but I declare that I am the original inventor of the combination of which the description heretofore given indicates the character.

Fourth. I have invented the combination of the stopping guide and weight with the thread or yarn, as the same is formed by the machine; by which the machine is brought 6794x Oct 11, 1831 to rest whenever the unity of the thread is destroyed. In this also I declare myself the inven
tor of the combination of which the particular description heretofore given, points out the
character without intending to limit the invention to the specific form of apparatus described Under the four preceding heads I have stated summarily the sub
stance of my invention, and I do not herein claim Letters Patent as the inventor of any
parts or combinations not included in them however such parts or combinations may
have been described in the foregoing specification or shown in the drawings referred
to therefrom.

In testimony that the above is a true specification of my said
invention I have hereto set my hand this first day of September in the year of our
Lord, Eighteen hundred and thirty one Witnesses
Charles P. Curtis
J. S. B. Alleyne Daniel Treadwell.

Recd & Recorded anew 29th Oct. 1838.
Drawings Received.

11.500 words x2
[illegible]